(No Model.)

J. B. HABERLE.
SPRINKLER.

No. 466,345.  Patented Jan. 5, 1892.

WITNESSES.
A. W. Smith
E. S. Buck

INVENTOR.
John B. Haberle
By his Atty.
R. W. O. Smith

UNITED STATES PATENT OFFICE.

JOHN B. HABERLE, OF SOUTH BEND, INDIANA.

SPRINKLER.

SPECIFICATION forming part of Letters Patent No. 466,345, dated January 5, 1892.

Application filed September 16, 1891. Serial No. 405,913. (No model.)

*To all whom it may concern:*

Be it known that I, JOHN B. HABERLE, of South Bend, in St. Joseph county, and State of Indiana, have invented new and useful Improvements in Sprinkler-Heads for Perambulating Sprinkling-Carts; and I do hereby declare that the following is a full and accurate description of the same, reference being had to the accompanying drawings, in which—

Figure 1:
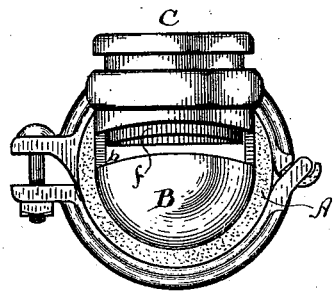
Figure 2:
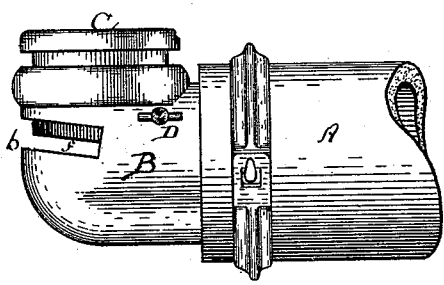
Figure 5:
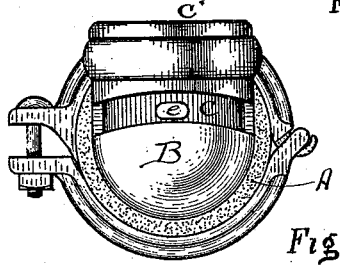
Figures 3, 4:
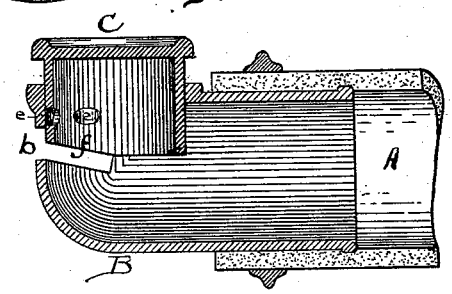
Figure 6:

Figure 1 is a front elevation of my sprinkler-head. Fig. 2 is a side elevation of the same. Fig. 3 is a vertical transverse section of the same. Fig. 4 is a vertical longitudinal section of the same. Fig. 5 is a front elevation showing adjustment for throwing a round stream. Fig. 6 is a perspective view of my cart, one head being represented as throwing a flat stream and the other head throwing two round streams.

My invention has particular reference to those small and inexpensive two-wheeled sprinkling-carts which are almost exclusively employed by farmers to sprinkle their growing crops with water for irrigation or with a poisonous liquid for the destruction of insect pests; and it has been a particular object to attain efficiency with simplicity and cheapness of structure.

The tank is frequently a large barrel mounted upon a cart-axle supported by two wheels. In the bottom of the tank a valve is placed whereby the driver may control the discharge of the liquid contents. To the discharge-pipe below said valve one or two short sections of hose or pipe A are attached, and at their extremities the sprinkling-heads are placed, which form the subject of this patent. The sprinkling-head B is a cast-iron (or other metal) tube, most conveniently made with a short bend at one end, and a transverse slit $b$, through which the water will escape in a flat jet. A tubular cap C is fitted to close and project into the open end of the head B. The tubular portion of said cap is sufficiently long to project across and close the slit $b$ when pushed entirely in and on one side. Said tubular part is beveled to correspond with the plane of the slit $b$, so that it may be employed to vary the width of said slit, and thereby vary the thickness and volume of the issuing jet. A screw D serves to set and hold the cap C at the desired point.

When poisoned water is employed, it is generally desired to direct the jet upon the plants only and not at all upon the ground. I therefore make a jet-hole $e$ in one side of the tubular part of the cap, most conveniently upon the side opposite the beveled portion $f$, so that by rotating the cap C one half-revolution or thereabout the jet-slit $b$ may be closed and the jet-hole $e$ will be presented opposite said slit and the poisoned water thereby projected in a single stream directly upon the plants to be treated.

It is evident the hole $e$ may be otherwise placed with reference to the beveled edge $f$—that is to say, for instance, it might be placed above the part $f$, instead of opposite thereto without changing the invention.

Having described my invention, I claim—

1. The sprinkling-head B, provided with the jet-slit $b$, and the tubular cap C, adjustable in the open end of said head and provided with the jet-hole $e$, as and for the purpose set forth.

2. The sprinkler-head B, provided with the jet-slit $b$, and the tubular cap C, provided with the beveled portion $f$ and with the jet-hole $e$, whereby by a change of position of said cap the issuing jet may be a flat or round stream, as preferred.

JOHN B. HABERLE.

Witnesses:
 IRA S. ARMSTRONG,
 HOWARD J. STACK.